United States Patent
Lüftl

(10) Patent No.: US 12,092,196 B2
(45) Date of Patent: Sep. 17, 2024

(54) DIFFERENTIAL LOCK FOR LOCKING COMPENSATING MOVEMENTS IN A DIFFERENTIAL GEAR

(71) Applicant: ZF Friedrichshafen AG, Friedrichshafen (DE)

(72) Inventor: Julian Lüftl, Tiefenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/488,205

(22) Filed: Oct. 17, 2023

(65) Prior Publication Data

US 2024/0141974 A1 May 2, 2024

(30) Foreign Application Priority Data

Oct. 27, 2022 (DE) ...................... 10 2022 211 408.6

(51) Int. Cl.
*F16H 48/32* (2012.01)
*F16H 48/24* (2006.01)

(52) U.S. Cl.
CPC ............. *F16H 48/32* (2013.01); *F16H 48/24* (2013.01)

(58) Field of Classification Search
CPC .......... F16H 48/24; F16H 48/27; F16H 48/32; F16D 11/14; F16D 2011/004
See application file for complete search history.

(56) References Cited

U.S. PATENT DOCUMENTS

| 3,457,807 | A | * | 7/1969 | Altmann | ................. F16H 48/08 475/240 |
| 3,899,938 | A | * | 8/1975 | Crabb | ...................... F16H 48/10 475/86 |
| 4,549,449 | A | | 10/1985 | Miller et al. | |
| 4,759,232 | A | * | 7/1988 | Roberts | ................... F16H 48/08 475/86 |

(Continued)

FOREIGN PATENT DOCUMENTS

| CN | 104482163 A | 4/2015 |
| DE | 1 161 483 | 1/1964 |

(Continued)

OTHER PUBLICATIONS

German Patent Office, German Search Report issued in German application No. 10 2022 211 409.4 (Sep. 11, 2023).

(Continued)

*Primary Examiner* — Stacey A Fluhart
*Assistant Examiner* — Aimee Tran Nguyen
(74) *Attorney, Agent, or Firm* — Finch & Maloney PLLC

(57) ABSTRACT

A differential lock is configured for locking compensation movements between drive output shafts (4) in a differential gearbox of a vehicle. In the locking condition, at least one of the drive output shafts (4) is connected with interlock to a differential cage (2) connected to a drive input, by means of a sliding sleeve (5) which is connected rotationally fixed to the drive output shaft (4) and can be displaced axially, For axial movement of the sliding sleeve (5), which is pre-stressed against at least one spring element (7), the action of a pressure (6) is provided. The spring element (7) is arranged, at least partially, radially inside the sliding sleeve (5). In addition a differential gearbox with the differential lock is proposed.

10 Claims, 2 Drawing Sheets

(56) References Cited

U.S. PATENT DOCUMENTS

| | | | |
|---|---|---|---|
| 4,960,011 A * | 10/1990 | Asano | F16D 35/005 |
| | | | 74/650 |
| 5,030,181 A * | 7/1991 | Keller | F16H 48/30 |
| | | | 192/84.92 |
| 5,273,499 A | 12/1993 | Friedl et al. | |
| 5,299,986 A | 4/1994 | Fabris et al. | |
| 5,342,255 A | 8/1994 | Slesinski et al. | |
| 5,947,859 A | 9/1999 | McNamara | |
| 6,450,915 B1 | 9/2002 | Kazaoka | |
| 6,582,334 B1 | 6/2003 | Noll | |
| 6,620,073 B2 | 9/2003 | Kazaoka et al. | |
| 7,527,575 B2 | 5/2009 | Salg et al. | |
| 9,422,988 B2 * | 8/2016 | Beesley | F16D 27/02 |
| 2002/0103053 A1 | 8/2002 | Thompson | |
| 2004/0248692 A1 | 12/2004 | Bryson et al. | |
| 2005/0070393 A1 * | 3/2005 | DeGowske | F16H 48/08 |
| | | | 475/220 |
| 2006/0247087 A1 | 11/2006 | Pontanari et al. | |
| 2006/0276298 A1 | 12/2006 | Rodgers et al. | |
| 2007/0037655 A1 | 2/2007 | Salg et al. | |
| 2007/0219041 A1 | 9/2007 | Huber et al. | |
| 2011/0136611 A1 * | 6/2011 | Martin, III | F16H 48/30 |
| | | | 475/220 |
| 2011/0269593 A1 * | 11/2011 | Knowles | F16H 48/34 |
| | | | 475/84 |

FOREIGN PATENT DOCUMENTS

| | | |
|---|---|---|
| DE | 1 948 616 | 4/1971 |
| DE | 40 21 653 A1 | 1/1991 |
| DE | 10 2018 210 691 A1 | 1/2020 |
| GB | 1 382 926 | 2/1975 |
| GB | 1 429 492 | 3/1976 |
| GB | 1 474 518 | 5/1977 |
| GB | 1 548 080 | 7/1979 |
| WO | 00/61972 | 10/2000 |
| WO | 2010/005411 A1 | 1/2010 |

OTHER PUBLICATIONS

German Patent Office, German Search Report issued in German application No. 10 2022 211 408.6 (Sep. 11, 2023).

* cited by examiner

DIFFERENTIAL LOCK FOR LOCKING COMPENSATING MOVEMENTS IN A DIFFERENTIAL GEAR

RELATED APPLICATIONS

This application claims the benefit of and right of priority under 35 U.S.C. § 119 to German Patent Application no. 10 2022 211 408.6, filed on 27 Oct. 2022, the contents of which are incorporated herein by reference in its entirety.

FIELD OF THE DISCLOSURE

The present invention relates to a differential lock for locking compensating movements between drive output shafts in a differential gearbox of a motor vehicle. In addition, the invention relates to a differential gearbox with a differential lock.

BACKGROUND

For example, from the document DE 27 21 701 A1 a driven vehicle axle with a compressed-air-controlled differential lock is known. The vehicle axle comprises a differential in the form of a planetary gearset, wherein a driven cage encloses the differential, and in the locking condition of the differential lock, the differential can be used with one of the current interlocks. The differential lock comprises a piston connected rotationally fixed to one of the axle shafts, which piston can be moved axially under the action of pressure, so that a toothed section of the piston can be brought into engagement with a toothed section of the cage. The piston is held by a helical spring in the non-locking condition of the differential lock. The helical spring surrounds the piston element and is supported on one side against the piston and on the other side against a housing-side cylinder that surrounds the piston, so that the helical spring is arranged outside the differential. In that way considerable axial fitting space is provided for the differential.

SUMMARY

The purpose of the present invention is to propose a differential lock and a differential gearbox which are designed in a particularly space-saving manner.

According to the invention, this objective is achieved by the features disclosed herein. Advantageous and claimed further developments emerge from the claims, the description, and the drawings.

Thus, a differential lock for locking compensation movements between drive output shafts in a differential gearbox of a vehicle is proposed, wherein, in the locking condition, at least one of the drive output shafts is connected with interlock, by means of a sliding sleeve which is connected rotationally fixed to the drive output shaft and can be displaced axially, to a differential cage connected to a drive input, and wherein, for the axial movement of the sliding sleeve which is prestressed against at least one spring element, the sliding sleeve is acted upon by pressure, for example by means of compressed air or the like. To produce as space-saving an arrangement as possible, it is provided that the spring element is arranged at least partially radially inside the sliding sleeve.

In that way, the spring element, which for example can be in the form of a helical spring or the like, is arranged as viewed radially inside the sliding sleeve and therefore inside the differential or the differential lock, so that a radially nested configuration of the spring element and the sliding sleeve is produced, which makes for a particularly space saving arrangement such that the proposed differential lock, as viewed axially, is substantially shorter than the known differential lock.

Preferably, in the proposed differential lock the sliding sleeve is shell-shaped, and the sliding sleeve and the spring element are arranged coaxially with the drive output shaft. Since the spring element, as viewed radially, is positioned between the drive output shaft and the sliding sleeve, the nested configuration is further optimized, and additional fitting space is saved.

In order to be able to arrange the spring element at least partially inside the differential or the differential lock, it is provided that an internal diameter of the differential cage in the area of a bearing on the housing side is larger than an external diameter of an axle bevel gearwheel and larger than an internal diameter of the sliding sleeve.

Since the spring element or compression spring is supported on one side against an axle bevel gearwheel connected rotationally fixed to the drive output shaft and on the other side, for example, against an internal diameter step of the sliding sleeve, the spring can be designed such that by way of the spring force the contact pattern in the locking teeth is optimized. Furthermore, by positioning the spring element between the axle bevel gearwheel and the sliding sleeve, a certain amount of prestressing force acts upon the differential gearwheels, which results in an optimization not only of the contact pattern but also of the acoustics.

In the proposed differential lock, the interlocking connection or locking teeth between the differential cage and the sliding sleeve can be realized if the sliding sleeve has external teeth or the like on the radial side, which can be brought into engagement with radial-side internal teeth or the like on the differential cage. In that way, by virtue of the radially directed locking teeth on the sliding sleeve and the differential cage a differential lock optimized in relation to the necessary fitting space is produced. Owing to the coaxial arrangement relative to the drive output shaft, a nested structure is produced which on the one hand ensures a particularly space-saving configuration and on the other hand ensures sufficient locking torque transmission by virtue of the radially directed locking teeth.

Preferably, it can be provided that the external teeth on the sliding sleeve and the internal teeth of the differential cage form interlocking locking teeth in the form of splines. This has the advantage that they can be designed as flank-bearing or flank-centered, or even diameter-bearing or diameter-centered. Consequently, a predetermined clearance at the tooth tip and/or the tooth root of the splines can be provided. For example, splines standardized in accordance with DIN 5480 can be used, which brings further advantages for production.

Another alternative embodiment of the interlocking connection or locking teeth can be produced if the sliding sleeve has teeth on the axial side, which can be brought into engagement with corresponding axial-side teeth of the differential cage. With this alternative arrangement of the locking teeth radial fitting space is saved.

For example, the axial-side teeth on the sliding sleeve and the axial-side teeth of the differential cage can form locking teeth in the manner of end-face claw teeth or the like.

The objective addressed by the invention is also achieved by a differential gearbox comprising at least one differential lock as described above. This achieves the advantages already described as well as others. Preferably, as the differential gearbox a differential gearbox with bevel gearwheels is equipped with the differential lock.

BRIEF DESCRIPTION OF THE DRAWINGS

Below, the present invention is explained in greater detail with reference to the drawings, which show.

DETAILED DESCRIPTION

Figure 1:
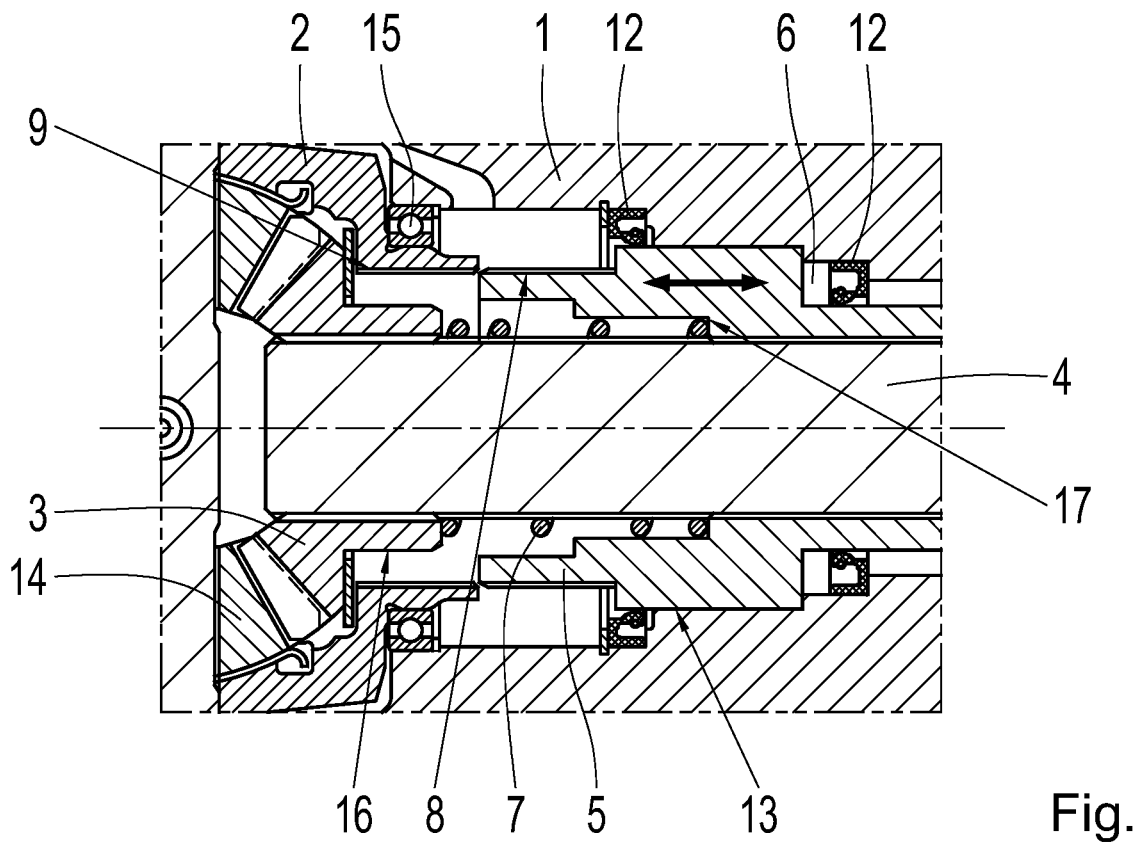
FIG. 1: A schematically represented, sectioned part-view of a first embodiment variant of a differential gearbox according to the invention with a differential lock according to the invention having splines as the locking teeth, shown in the non-locking condition.
Figure 2:
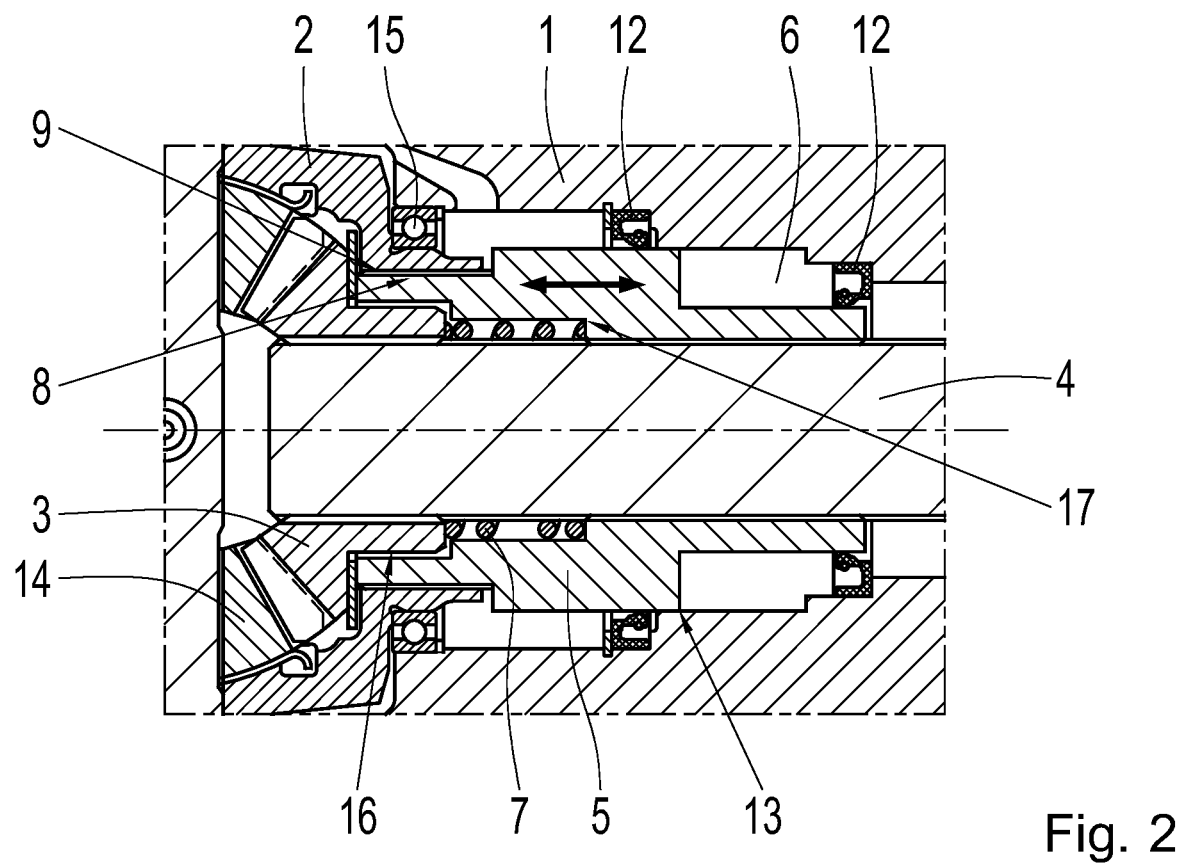
FIG. 2: A schematically represented, sectioned part-view of the first embodiment variant of the differential gearbox, with the differential lock, shown in the locking condition.
Figure 3:
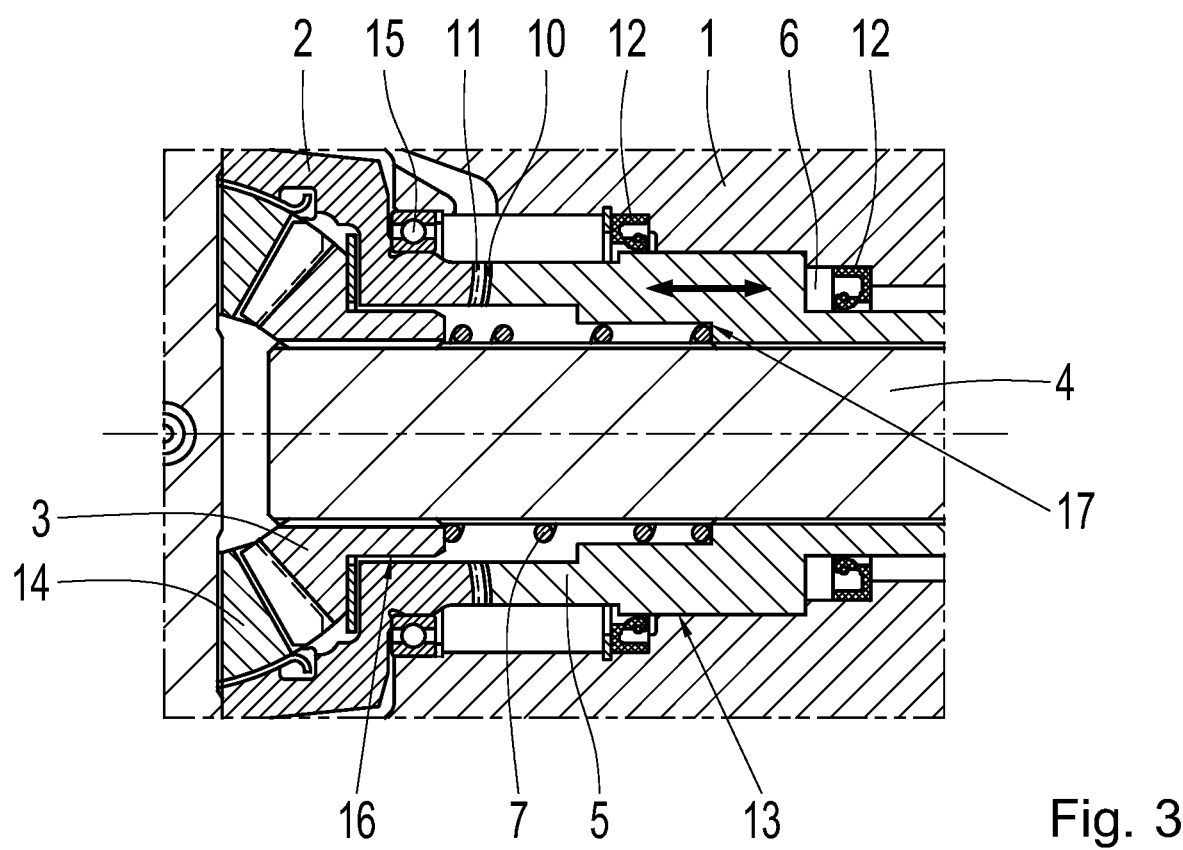
FIG. 3: A schematically represented, sectioned part-view of a second embodiment variant of the differential gearbox with the differential lock, having end-face claws as the locking teeth, shown in the non-locking condition.

FIGS. 1 to 3 show a first and a second embodiment variant of a differential gearbox of a vehicle according to the invention, for example in the form of a bevel gear differential gearbox, with a differential lock according to the invention in the non-locking and in the locking condition.

The bevel gear differential gearbox with its differential lock is accommodated in a housing 1. The bevel gear differential gearbox comprises a driven differential cage 2, which drives associated drive output shafts 4 by way of differential gearwheels 14 and axle bevel gearwheels 3.

In the locking condition of the differential lock, at least one of the drive output shafts 4 is connected with interlock to the differential cage 2, so that no compensating movement between the drive output shafts 4 is possible.

As the differential lock, in the bevel gear differential gearbox an interlocking coupling with a first coupling partner and a second coupling partner is provided. The first coupling partner is provided on one of the drive output shafts 4 on a sliding sleeve 5 and the second coupling partner is provided on the differential cage 2. Thus, the bevel gear differential gearbox has an integrated differential lock. The differential lock is arranged coaxially in relation to a rotation axis of the drive output shafts 4.

In the proposed differential lock, regardless of the embodiment variant it is provided that the sliding sleeve 5, which is connected rotationally fixed to the drive output shaft 4 and is axially displaceable, can be moved by the action of pressure 6, while the axial movement of the sliding sleeve 5 takes place against a force of at least one spring element 7 so that the sliding sleeve 5 is prestressed. To achieve an arrangement as space-saving as possible, it is provided that the spring element 7 is arranged at least partially radially inside the sliding sleeve 5.

The action of pressure 6 takes place via a pressure chamber which is sealed on both sides by sealing elements 12 arranged between the housing 1 and the sliding sleeve 5. The shifting force produced for example by compressed air is larger than the spring force exerted by the spring element 7. As soon as the pressure 6 is relieved, the spring element 7 ensures that the sliding sleeve 5 moves away again from the differential cage 2 and the differential lock is disengaged. Preferably, the sliding sleeve 5 is mounted on the housing by means of a slide bearing 13.

The sliding sleeve 5 is shaped approximately as a shell or annular cylinder and serves as a coupling partner for forming the interlocking connection and also as an actuating element acted upon by pressure to bring about the axial movement of the sliding sleeve, so that the differential lock can be shifted from its non-locking condition to its locking condition, and vice-versa.

The sliding sleeve 5 and the spring element 7 are arranged coaxially with the drive output shaft 4. Moreover, an internal diameter of the differential cage 2 in the area of a bearing 15 on the housing is larger than an external diameter 16 of the axle bevel gearwheel 3 connected rotationally fixed to the drive output shaft 4. Furthermore, the internal diameter of the differential cage 2 in the area of the bearing 15 on the housing is also larger than an internal diameter of the sliding sleeve 5 which accommodates the spring element 7. The spring element 7 rests on one side against the axle bevel gearwheel 3 connected rotationally fixed to the drive output shaft 4, and on the other side against an internal diameter step 17 of the sliding sleeve 5.

FIGS. 1 and 2 show a first embodiment variant of the differential lock, in which the sliding sleeve 5 has radial external teeth 8 which can be brought into engagement with radial internal teeth 9 of the differential cage 2. The external teeth 8 of the sliding sleeve 5 and the internal teeth 9 of the differential cage 2 form locking teeth configured as splines.

FIG. 1 shows the non-locking condition of the differential lock, in which the external teeth 8 of the sliding sleeve 5 are not engaged with the internal teeth 9 of the differential cage 2.

By contrast FIG. 2 shows the locking condition of the differential lock, in which the external teeth 8 of the sliding sleeve 5 are engaged with the internal teeth 9 of the differential cage 2.

FIG. 3 shows a second embodiment variant of the differential lock, in which the sliding sleeve 5 has axial teeth 10 which can be brought into engagement with corresponding axial teeth 11 of the differential cage 2. The axial teeth 10 of the sliding sleeve 5 and the axial teeth 11 of the differential cage 2 form locking teeth configured as end-face claw teeth. FIG. 3 shows the non-locking condition of the differential lock, in which the axial teeth 10 of the sliding sleeve 5 and the axial teeth 11 of the differential cage 2 are not engaged with one another.

INDEXES

1 Housing
2 Differential cage
3 Axle bevel gearwheel
4 Drive output shaft
5 Sliding sleeve
6 Action of pressure, or pressure chamber
7 Spring element
8 Radial external teeth of the sliding sleeve
9 Radial internal teeth of the differential cage
10 Axial teeth of the sliding sleeve
11 Axial teeth of the differential cage
12 Sealing element
13 Sliding bearing location
14 Differential gearwheel
15 Bearing of the differential cage on the housing
16 External diameter of the axle bevel gear
17 Internal diameter step of the sliding sleeve

The invention claimed is:

1. A differential lock for locking compensation movements between drive output shafts in a differential gearbox of a vehicle,
    wherein, in a locking condition, at least one of the drive output shafts is connected with interlock to a differential cage connected to a drive input by a sliding sleeve rotationally fixedly connected to the at least one drive output shaft,
    the sliding sleeve is configured to be displaced axially by action of a pressure,
    the sliding sleeve is prestressed against at least one spring element,
    the spring element is arranged at least in part radially inside the sliding sleeve,
    a pressure chamber, for generating pressure, is defined by a surface of the sliding sleeve and a surface of a housing enclosing the differential cage, and
    a pair of sealing elements are arranged on opposite sides of the pressure chamber and directly engage with both the housing and the sliding sleeve to assist with sealing of the pressure chamber.

2. The differential lock according to claim 1, wherein the sliding sleeve is shell-shaped, and the sliding sleeve and the spring element are arranged coaxially with the at least one drive output shaft.

3. The differential lock according to claim 1, wherein an internal diameter of the differential cage, in an area of a bearing on the housing, is larger than an external diameter of an axle gearwheel and larger than an internal diameter of the sliding sleeve.

4. The differential lock according to claim 1, wherein the spring element is supported, on one side, against an axle bevel gearwheel rotationally fixedly connected to the drive output shaft, and, on an other side, against an internal diameter step of the sliding sleeve.

5. The differential lock according to claim 1, wherein the sliding sleeve has radial external teeth which are configured to be brought into engagement with radial internal teeth of the differential cage.

6. The differential lock according to claim 5, wherein the external teeth of the sliding sleeve and the internal teeth of the differential cage form locking teeth in the form of splines.

7. The differential lock according to claim 1, wherein the sliding sleeve has axial teeth which are engageable with corresponding axial teeth of the differential cage.

8. The differential lock according to claim 7, wherein the axial teeth of the sliding sleeve and the axial teeth of the differential cage form locking teeth in the form of end-face claw teeth.

9. A differential gearbox with a differential lock according to claim 1.

10. A differential lock for locking compensation movements between drive output shafts in a differential gearbox of a vehicle,
    wherein, in a locking condition, at least one of the drive output shafts is connected by an interlock to a differential cage connected to a drive input via a sliding sleeve rotationally fixedly connected to the at least one drive output shaft,
    the sliding sleeve is configured to be displaced axially by action of fluid pressure to achieve the locking condition,
    the sliding sleeve is prestressed against at least one spring element,
    the spring element is arranged at least in part radially inside the sliding sleeve with a first end of the spring element abutting against the sliding sleeve and a second end abutting against a gearwheel of the differential lock,
    a pressure chamber, for generating the fluid pressure, is defined by an exterior surface of the sliding sleeve and an interior surface of a housing enclosing the differential cage, and
    a pair of sealing elements are arranged on opposite sides of the pressure chamber and directly engage with both the interior surface of the housing and the exterior surface of the sliding sleeve to assist with sealing of the pressure chamber.

* * * * *